No. 743,651. PATENTED NOV. 10, 1903.
H. T. MINICK.
CORN HUSKING MACHINE.
APPLICATION FILED OCT. 20, 1902.
NO MODEL. 3 SHEETS—SHEET 1.
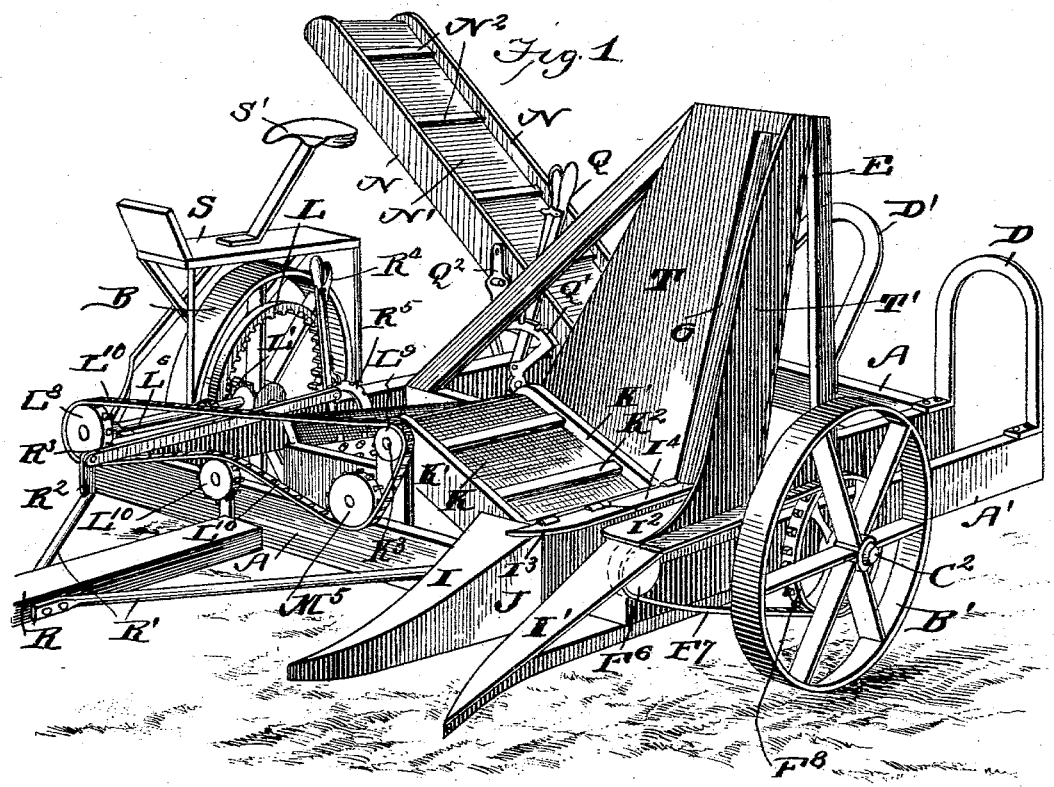
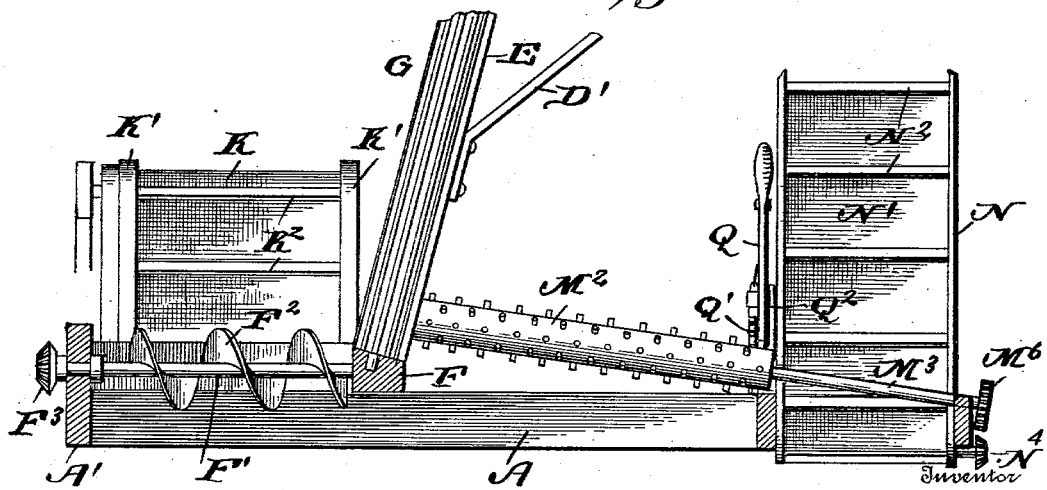
Witnesses
J. C. Shaw
Edward Shaw
Inventor
Herbert T. Minick
By Edward Brock
Attorneys

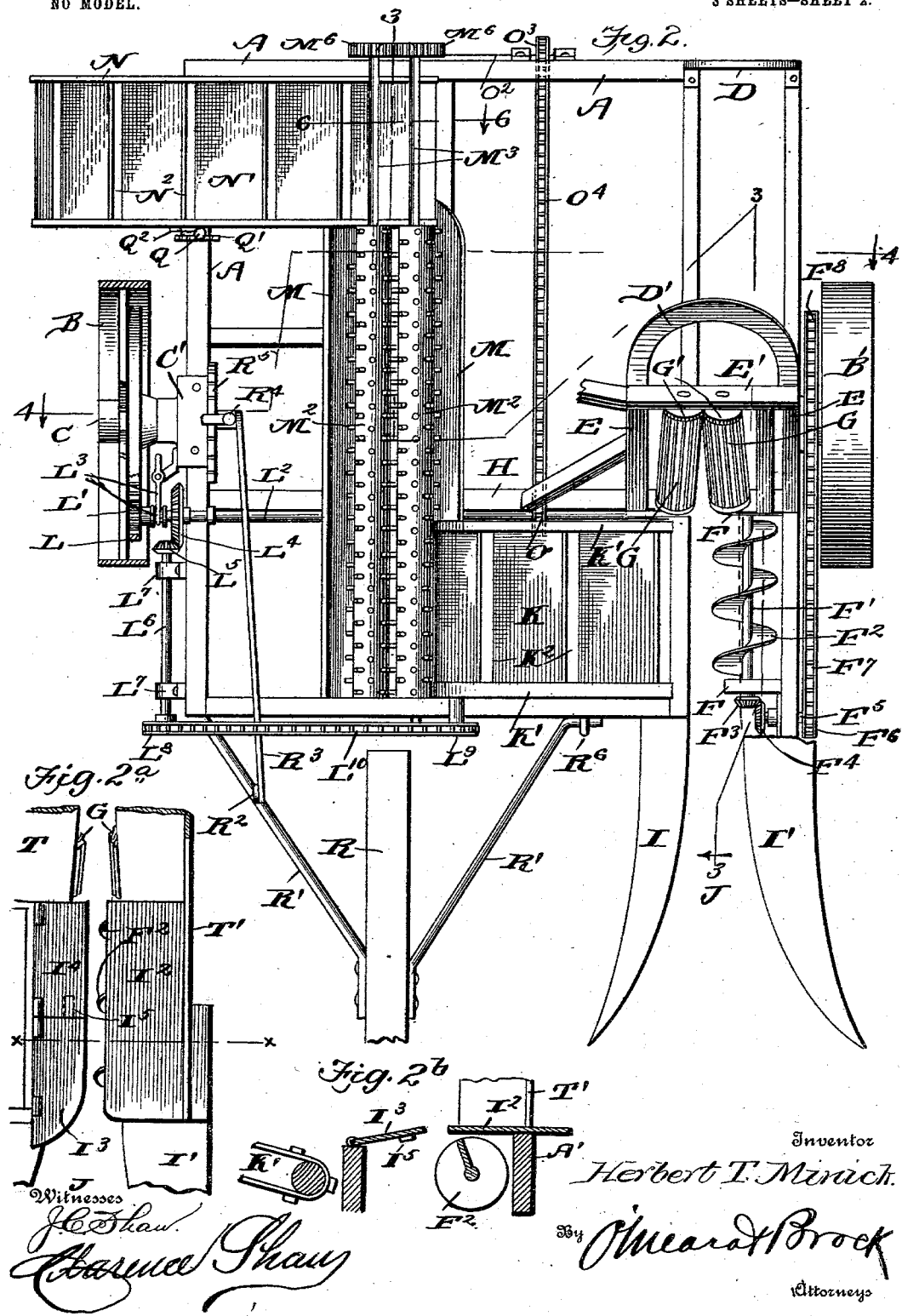

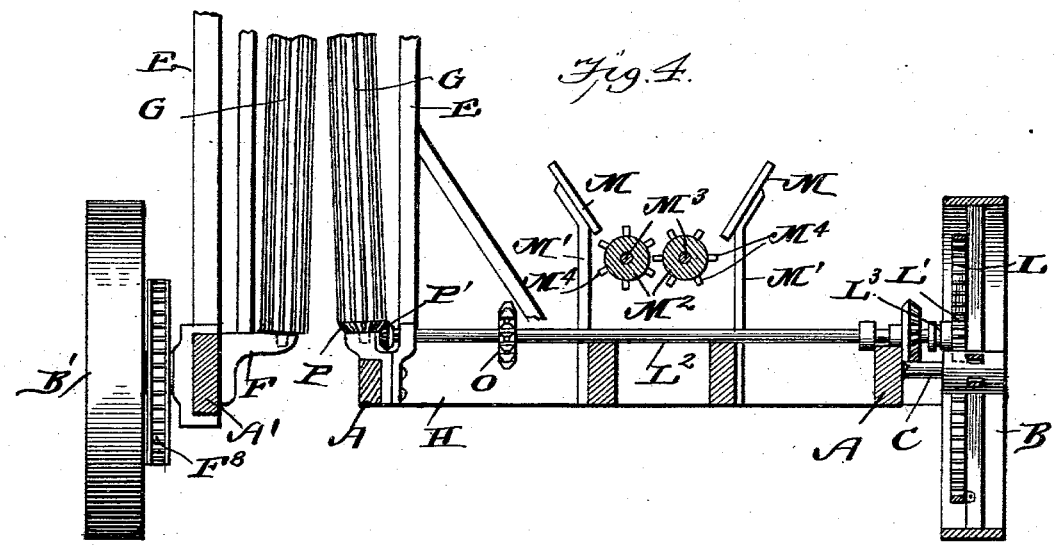
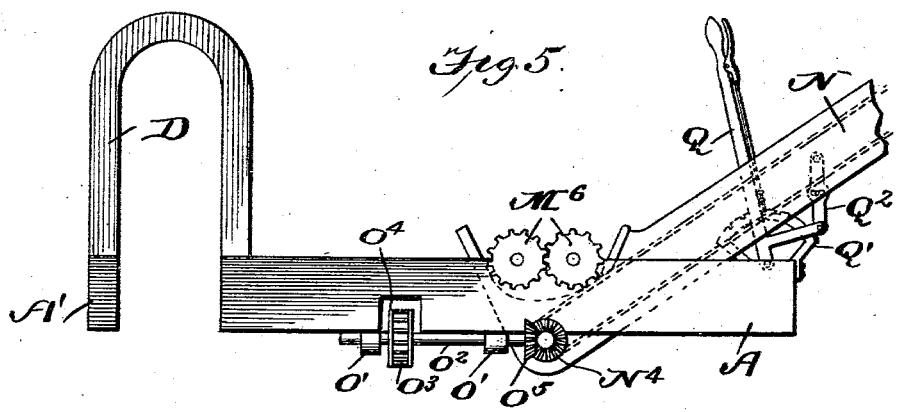
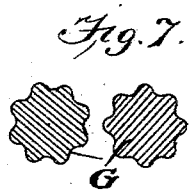
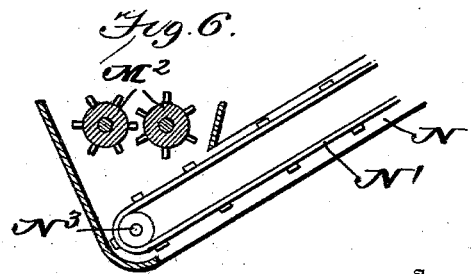

No. 743,651. Patented November 10, 1903.

UNITED STATES PATENT OFFICE.

HERBERT T. MINICK, OF NEMAHA, NEBRASKA, ASSIGNOR OF ONE-THIRD TO CHARLES T. MINICK, OF BRACKEN, NEBRASKA.

CORN-HUSKING MACHINE.

SPECIFICATION forming part of Letters Patent No. 743,651, dated November 10, 1903.

Application filed October 20, 1902. Serial No. 128,000. (No model.)

*To all whom it may concern:*

Be it known that I, HERBERT T. MINICK, a citizen of the United States, residing at Nemaha, in the county of Nemaha and State of Nebraska, have invented a new and useful Corn-Husking Machine, of which the following is a specification.

My invention is an improved corn gatherer and husking machine, and has for its object the gathering of growing corn, leaving the stalk standing, to strip the husk and silk from the corn, and then elevate same into a wagon.

I am aware of the fact that corn-harvesters have been invented with these same objects in view, and the novelty of my improvement lies in the construction employed.

Briefly my improvement comprises a wheeled frame having upright corrugated revoluble shafts converging and intermeshing at their upper ends and adapted to permit the cornstalks to pass between them, but taking off the ears and dropping them on a conveyer leading to a husking device, from which the corn is elevated to a wagon. As the corrugated shafts are of considerable length, corn will be gathered from the stalk whether the ear is near the ground or formed at some distance above it, and this without risk of tearing and mutilating the stalk, as is the case with machines where the stalk is passed lengthwise through the gathering device.

In the accompanying drawings, Figure 1 is a perspective view of my device. Fig. 2 is a plan view of the same. Fig. 3 is a sectional view about on the line 3 3 of Fig. 2. Fig. 4 is a detail section about on the line 4 4, Fig. 2. Fig. 5 is a view of the rear end of the machine. Fig. 6 is a sectional view on about the line 6 6 of Fig. 2. Fig. 7 is a detail sectional view taken through the stripping-rollers. Fig. $2^a$ is a plan view showing the decks. Fig. $2^b$ is a sectional view through the decks.

In carrying out my improvement I employ a rectangular box-frame A, supported at one side by the wheel B, rigidly mounted on the revoluble stub-axle C, journaled at its inner end in a suitable box C'. Parallel to and a short distance from the frame A on the side opposite the wheel B is a frame A', supported on its outer side by a wheel B', carried by the stub-axle $C^2$, journaled at its inner end in the same way as the axle C. A yoke D connects the two frames at their rear ends, and midway their ends the frames are connected by the uprights E and cross-piece E', braced by the yoke D'.

The frame A' carries inwardly-projecting blocks F, in which are journaled a shaft F', extending parallel with the frame A' and carrying screw-blades $F^2$ between the blocks and a bevel-gear $F^3$ at its forward end. This gear meshes with a bevel-gear $F^4$, carried by a stub-shaft $F^5$, passing through the frame A' and carrying at its outer end a sprocket-wheel $F^6$. A chain $F^7$ passes from this sprocket-wheel to the sprocket-wheel $F^8$, carried by the revoluble axle $C^2$.

Mounted on the frames A A', respectively, and to the rear of the screw $F^2$ are two revoluble upright converging corrugated rollers G, carrying intermeshing gears G' at their upper ends. At their lower ends the rollers are journaled on the block F and the crossbeam H, respectively, and at their upper ends in the cross-bar E'. To the front of the frames extend the guards and shields I I', tapering to a point and curved outwardly. At the rear of the guard I' is a stationary deck $I^2$, which protects the screw $F^2$, the latter projecting just far enough from beneath one side of the deck to enable it to catch and draw in the stalks. Opposite to this deck are two hinged decks $I^3$ $I^4$, the deck $I^3$ having a curved front edge, which is engaged by the stalks and the deck raised. A lip $I^5$ is carried by this deck on its lower service, which engages the deck $I^4$ and raises it. As soon as the stalk has passed the first deck the deck falls behind it, and the stalk is guided by the second deck to the rollers G.

For convenience and to prevent confusion the passage-way between the frames A A' will be termed J. On the forward part of the frame A is mounted an endless conveyer K, leading upward from the passage J and having the side pieces K' and cleats $K^2$. To drive this conveyer, a cog-wheel L is carried within the wheel B, which meshes with a cog L', carried by a shaft $L^2$, the cog L' being controlled by a sliding sleeve $L^3$ of any preferred construction operated by a suitable handle and adapted to carry the cog $L'$ into and out of engagement with the cog $L$. On the shaft is a beveled gear $L^4$, which meshes with the beveled gear $L^5$, carried by the inner end of the shaft $L^6$, which is journaled in brackets $L^7$, and at the end of the shaft is a sprocket-wheel $L^8$. At its upper end the conveyer-belt $K$ passes around a shaft $K^3$, which carries a sprocket $L^9$, and a chain $L^{10}$ passes over the sprocket-wheels $L^8$ $L^9$. In the rear of this conveyer, parallel with the passage $J$ and commencing at the front of the machine, are the downwardly-converging guideways $M$, supported by the uprights $M'$. Below and between these guideways are the rearwardly and downwardly inclined rollers $M^2$, carried by shafts $M^3$, journaled in the front and rear members of the frame $A$. The rollers $M^2$ are spaced slightly apart and are studded with pins $M^4$, adapted to pass those on the opposite roller. One of the shafts $M^3$ carries a sprocket $M^5$, over which passes the chain $L^9$. An idler $L^{11}$ holds the chain in engagement with the sprocket $M^5$. At their rear ends the shafts $M^3$ carry intermeshing gears $M^6$. The rollers $M^2$ do not extend to the extreme rear of the frame $A$, but terminate at the foot of an elevator arranged between the rollers and the rear of the frame. This elevator comprises the side members $N$, the endless belt $N'$, and cleats $N^2$ and projects laterally and upwardly from the frame $A$. The belt $N'$ receives motion from a shaft $N^3$ at its lower end, around which the belt passes. The shaft $N^3$ is driven from the shaft $L^2$, as follows: A sprocket-wheel $O$ is secured on the shaft $L^2$, and at the rear of the frame, journaled in brackets $O'$ and parallel to the shaft $L^2$, is a short shaft $O^2$, carrying a sprocket-wheel $O^3$ in alinement with the sprocket $O$, and a sprocket-chain $O^4$ passes over the sprocket-wheels. The shaft $N^3$ carries a beveled gear $N^4$ at its rear end, which meshes with a beveled gear $O^5$, carried by the shaft $O^2$. At the end of the shaft $L^2$ is a beveled gear $P'$, meshing with the gear $P$, formed on the lower end of the currugated roller $G$, journaled in the main frame $A$. It will be seen, therefore, that both conveyers, the corrugated and the studded rollers all receive motion from the cog-wheel $L$ and can be thrown into and out of operation through the medium of the sliding sleeve $L^3$ and cog $L'$.

The inclination of the conveyer $N$ can be regulated by means of a lever $Q$, rack $Q'$, and link $Q^2$, all of ordinary construction. The tongue $R$ is supported by brace-rods $R'$, secured at one end to either side of the tongue, their inner ends being bent laterally and passed through eyes secured to the front of the frame. To one of these rods intermediate its ends is secured a short link $R^2$, to which is pivoted a rod $R^3$, connected at its rear end to a lever $R^4$, engaging a rack-segment $R^5$. As shown by Fig. 2, the tongue does not extend to the frame, and hence can be raised or lowered, the brace-rods turning in the eyes, and can be locked in any adjusted position by the lever engaging the rack.

On a platform $S$, supported above the main frame by suitable uprights and braces, is the seat $S'$.

Back of the conveyer $K$ is an upright rearwardly-inclined shield $T$, having a flange $T'$, adapted to prevent corn from falling to the rear of the conveyer.

In operation my harvester is driven through the field of corn, the guards $I$ $I'$ passing on opposite sides of the corn-rows. The stalks pass between these guards and between the upright rollers $G$, which pinch off the ears, whether growing high or low on the stalk, and throw them on the conveyer $K$, which passes them to the rollers $M^2$. The ears will travel down along these rollers to the elevator $N$, the pins $M^4$ stripping the husk from the ears and forcing it through the rollers. The conveyer $N$ elevates the husked ears into a wagon driven along by the side of the conveyer.

Having thus fully described my invention, what I claim as new, and desire to secure by Letters Patent, is—

1. A device of the kind described comprising a double frame adapted to permit the passage of cornstalks therethrough, stripping-rollers carried by said frame, an elevator at one side of the frame, downwardly and rearwardly inclined rollers having intermeshing pins adapted to convey corn to the elevator, a conveyer adapted to convey corn to the rollers, front and rear swinging decks hinged adjacent the receiving end of the conveyer, the front deck having a curved forward edge, means for guiding corn to said decks and means carried by the front deck for raising the rear deck.

2. A corn-husking machine comprising a main frame, a side frame connected to and spaced apart from the main frame by vertical yokes, a corrugated vertical roller carried by each frame said rollers converging and intermeshing at their upper ends, means for guiding stalks to said rollers, an endless conveyer arranged on the main frame in advance of and at right angles to said rollers, rearwardly and downwardly inclined husking-rollers, the upper ends of said rollers being adjacent to but below the delivery end of the endless conveyer, and means arranged at the lower ends of the husking-rollers for elevating ears of corn to a wagon.

HERBERT T. MINICK.

Witnesses:
   D. W. MAXWELL,
   A. R. TITUS.